No. 752,227. PATENTED FEB. 16, 1904.
W. T. HUDSON.
CANDY WORKING MACHINE.
APPLICATION FILED NOV. 20, 1903.
NO MODEL.
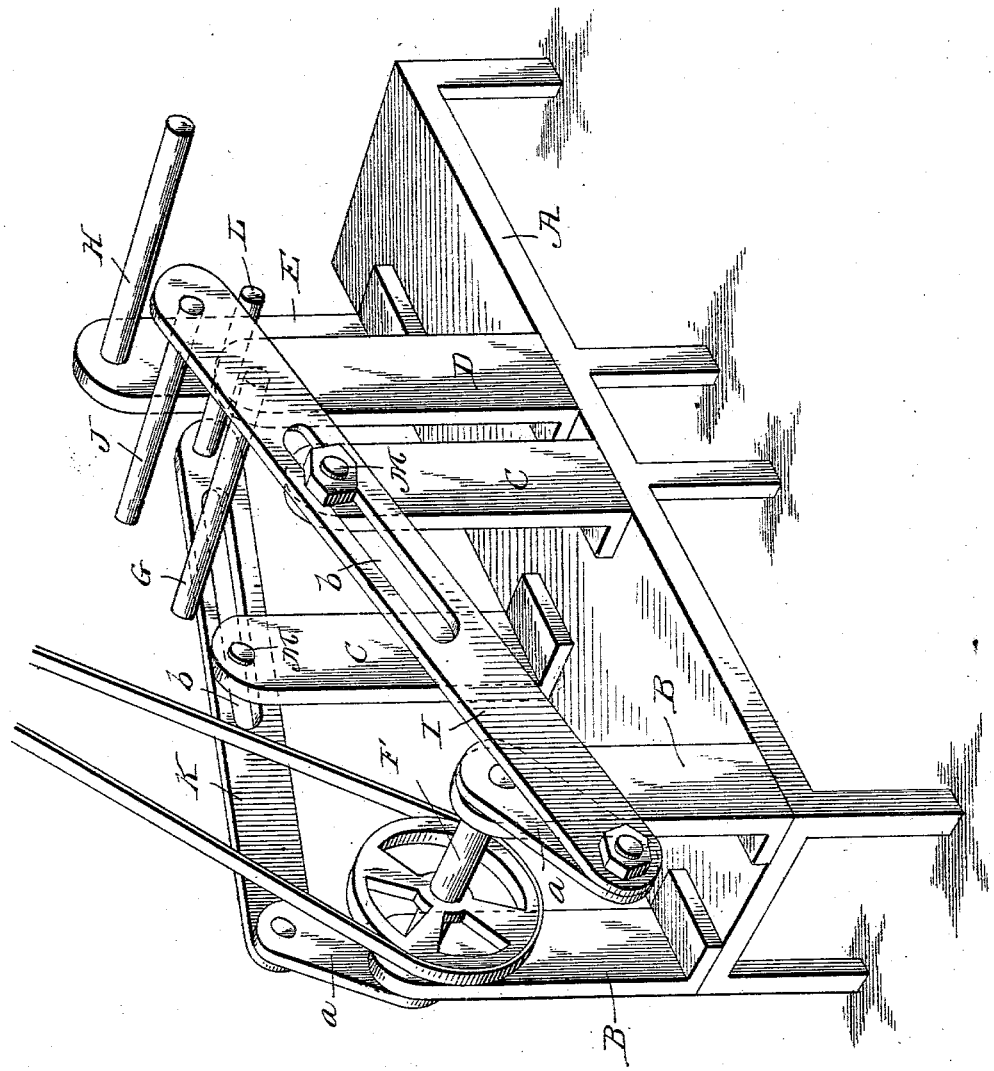
Witnesses
Harry L. Amer.
N. C. Healy
Inventor
William T. Hudson
By James J. Sheehy
Attorney No. 752,227. Patented February 16, 1904.

UNITED STATES PATENT OFFICE.

WILLIAM T. HUDSON, OF ATLANTA, GEORGIA.

CANDY-WORKING MACHINE.

SPECIFICATION forming part of Letters Patent No. 752,227, dated February 16, 1904.

Application filed November 20, 1903. Serial No. 181,992. (No model.)

*To all whom it may concern:*

Be it known that I, WILLIAM T. HUDSON, a citizen of the United States, residing at Atlanta, in the county of Fulton and State of Georgia, have invented new and useful Improvements in Candy-Working Machines, of which the following is a specification.

My invention pertains to candy pulling or working machines, and is designed more particularly as an improvement upon the machine constituting the subject-matter of my contemporary application, filed July 18, 1903, Serial No. 166,126. The said machine is calculated to work a mass of candy in a rotary manner and at the same time expand and contract the mass with a view of expediting the reduction of the candy to the state desired; and the object of the present invention is to provide a simple, inexpensive, and sturdy machine adapted to serve the same purpose.

With the foregoing in mind the invention will be fully understood from the following description and claims, when taken connection with the accompanying drawing, forming part of this specification, which illustrates in perspective my improved machine.

Referring by letter to the said drawing, A is the base of the machine, and B B, C C, and D E uprights which are connected to and rise from the base and serve in connection with the same to form the frame of the machine. The uprights B B are arranged in transverse alinement, as are also the uprights C C. The upright E, however, is arranged in advance of the upright D, as illustrated.

F is a shaft journaled in the uprights B and having cranks $a$ at its ends.

G is a grab fixedly connected to and extending laterally inward from the upright D; H, a similar grab fixed to and extending laterally inward from the upright E; I, a bar pivotally connected to one of the cranks $a$ of shaft F and carrying an inwardly-extending grab J; K, a similar bar connected to the other crank $a$ of shaft F and carrying an inwardly-extending grab L, and M M connections, preferably bolts, through the medium of which the bars I I are connected to the uprights C. The said bolts extend through longitudinal slots $b$ in the bars, and hence permit said bars to rock and move endwise on the uprights.

The movable grabs J and L are preferably disposed, as shown, with reference to each other and the stationary grabs G and H, and hence when the shaft F is rotated through the medium of a driving connection from a motor or other means the bars I will be reciprocated in the direction of their length and rocked, and the grabs J and L will be revolved about the stationary grabs H and G, respectively, and at the same time moved toward and from the centers about which they revolve. From this it follows that when a mass of candy is placed on the stationary and movable grabs it will not only be pulled or worked in the manner common to candy-pulling machines extant, but will at the same time be alternately expanded and contracted, and in this way the proper working and reduction of the candy to the state desired will be greatly expedited.

It will be readily appreciated from the foregoing that the machine constituting my present invention is a material simplification of that disclosed in my contemporary application aforesaid and yet is highly efficient in operation and is strong and durable in construction and not liable to wear or get out of order after a short period of use. It will also be appreciated that my present invention is very compact and takes up but a minimum amount of floor-space.

I have entered into a detailed description of the construction and relative arrangement of the parts embraced in the present and preferred embodiment of my invention in order to impart a full, clear, and exact understanding of the same. I do not desire, however, to be understood as confining myself to such specific construction and relative arrangement of parts, as such changes or modifications may be made in practice as fairly fall within the scope of my invention as claimed. For instance, it is obvious that I may duplicate the mechanism shown at the right of the crank-shaft F at the left thereof—that is to say, in addition to the uprights C D, grabs G, H, J, and L, and the rectilinearly-movable and rocking bars I and K illustrated I may use similar uprights, grabs, and bars at the left of the crank-shaft, the bars being connected to the cranks *a* of the shaft. In this way a machine possessing a capacity double that of the machine illustrated may be produced.

Having described my invention, what I claim, and desire to secure by Letters Patent, is—

1. In a candy-working machine, the combination of two grabs, one of which is revoluble about and movable toward and from a center, a shaft having a crank, and a bar connecting the movable grab, and the crank of the shaft, and mounted to rock and move endwise.

2. In a candy-working machine, the combination of a frame, a stationary grab carried by said frame, a grab revoluble about the stationary grab and movable toward and from the center about which it revolves, a shaft having a crank, and a bar connecting the movable grab and the crank, and mounted to rock and move endwise.

3. In a candy-working machine, the combination of a stationary grab, a grab revoluble about the stationary grab and movable toward and from a center, and means for actuating the revoluble grab.

4. In a candy-working machine, the combination of two stationary grabs, grabs revoluble about the stationary grabs and movable toward and from centers, and means for actuating said revoluble grabs.

5. In a candy-working machine, the combination of a frame, stationary grabs carried thereby, grabs, each of which is revoluble about one of the stationary grabs and movable toward and from a center, and means for actuating the revoluble grabs.

6. In a candy-working machine, the combination of a frame, a stationary grab carried thereby, a grab revoluble about the stationary grab and movable toward and from a center, a bar carrying the revoluble grab, and mounted to rock and move endwise, and means for actuating said bar.

7. In a candy-working machine, the combination of a frame, stationary grabs carried by the frame and arranged one in advance of the other, grabs, each of which is revoluble about one of the stationary grabs, and is movable toward a center, and bars carrying the revoluble grab, and mounted to rock and move endwise, and means for actuating said bars.

8. In a candy-working machine, the combination of a frame, a shaft journaled therein and having oppositely-disposed cranks, stationary grabs carried by the frame, and arranged one in advance of the other, grabs, each of which is revoluble about one of the stationary grabs, and is movable toward and from a center, and bars carrying the revoluble grabs, and mounted to rock and move lengthwise; said bars being connected to the cranks of the shaft.

9. In a candy-working machine, the combination of a stationary grab, and a grab revoluble about the stationary grab and movable toward and from a center.

In testimony whereof I have hereunto set my hand in presence of two subscribing witnesses.

WILLIAM T. HUDSON.

Witnesses:
W. A. BROWER,
J. M. GEORGE.